Jan. 5, 1971 T. A. SAVIDGE 3,552,982
APPARATUS AND METHOD FOR PACKAGING FOODS
Filed March 13, 1968

INVENTOR
THOMAS A. SAVIDGE
BY Edwin M. Thomas
ATTORNEY

3,552,982
APPARATUS AND METHOD FOR PACKAGING FOODS
Thomas A. Savidge, 1719 13th St., Anacortes, Wash. 98221
Filed Mar. 13, 1968, Ser. No. 717,483
Int. Cl. A23l 3/10
U.S. Cl. 99—214      4 Claims

ABSTRACT OF THE DISCLOSURE

Food products, especially meats such as chicken, and other poultry, fish, especially smoked salmon and the like, are packaged, cooked and preserved by sealing them first in a gas tight, heat resistant wrapper, subjecting to pressure greater than steam pressure at cooking temperature to collapse the wrapper tightly about the food, cooking at a temperature in excess of 230° F. while maintaining the pressure, and chilling to normal temperature while maintaining the pressure. Chilling may be accomplished indirectly, as by circulating cold water in the walls of the cooking and pressure vessel, or directly by spraying distilled or mineral-free water directly onto the packages which remain collapsed tightly about the food.

BACKGROUND AND PRIOR ART

Many types of food, particularly fish and other meats, have long been preserved by cooking them and placing them in hermetically sealed containers, such as tin coated metal cans, glass containers and the like. Such canned foods are usually of reasonably good quality but they always have a canned taste. Efforts to preserve such foods with a fresher taste by quick freezing and keeping in deep freeze storage have been reasonably successful. However, many types of food do not taste quite right after thawing, whether cooked before the deep-freezing or after the thawing. This is particularly true of delicately flavored meat products such as smoked salmon and other fish, especially that which is smoked promptly after catching. Chickens and other poultry loses much of its delicate flavor when it is either canned or held in refrigeration for an extended period, either before or after cooking. Moreover, many of these products will not keep long in refrigeration that does not keep them frozen.

Also, the demand for ready-to-eat foods of this type is increasing. Shipment and storage under refrigeration add substantially to the cost. Specific examples below refer to the preparation of packaged and cooked salmon, freshly smoked before packaging, but it will be understood that other food products may be treated similarly with comparably favorable results.

Thus in the prior art packaging of smoked salmon, as an example, the salmon is appropriately cleaned, cut up and smoked in a manner well known in the art. Then arises the problem of keeping it from spoiling. Even under refrigeration at usual temperatures down to 33° F., e.g. 38° F. and below, smoked salmon will mold in eight to ten days.

The use of plastic film or sheet material for wrapping food products such as those described above is of course well known, as in U.S. Pats. 2,538,025, 2,776,215 and others. The concept of shrinking the wrapper around the food is known, as in U.S. Pats. Nos. 2,745,419 and 2,368,-398. Meat and other products have been cooked after packaging in wrapping material as in U.S. Pat. No. 2,298,779. Analogous procedures, or certain process aspects that are similar, are described in U.S. Pats. Nos. 3,238,046 and 3,262,787. See also Nos. 2,830,909 and 2,988,452 and an article in "Food Engineering" magazine for January 1956, pages 92, 93, etc., describing the filling of plastic bags with a combination of potatoes and meat which are preheated, placed in bags which are sealed and cooked in a retort under pressure at about 250° F., etc.

The present process differs from all the above in several respects. Air is totally excluded from the container; the package is always kept tightly wrapped around and closely collapsed against the food. The container is absolutely impervious to air, moisture and other gases and vapors, over extended periods of time. The original flavors are all sealed in because the product is neither precooked nor preheated before the wrapper is sealed and collapsed around the food. To accomplish this is an object of the invention. Other objects will appear below.

DESCRIPTION OF PREFERRED EMBODIMENT

Figure 1:
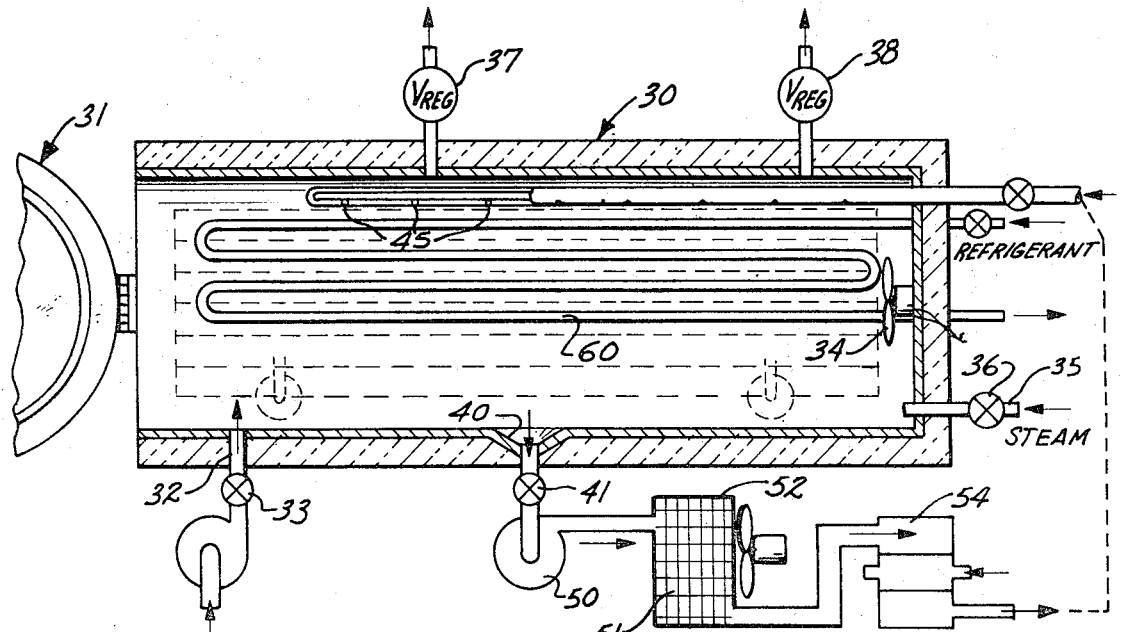
FIG. 1 is a sectional view, partly diagrammatical, of a retort chamber and a retort cart loaded with packages for treatment therein.
Figure 2:
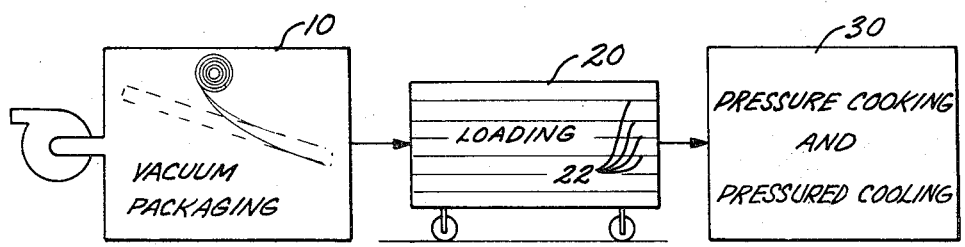
FIG. 2 is a block diagram showing steps in the process.

Referring first to FIG. 2, a food to be treated is processed in a sequence of steps. Processing of smoked salmon, fresh from the smoke house and cut into pieces of appropriate size for packaging and sale will be described as a typical example.

The uncooked but smoked pieces are packaged in a vapor and gas impervious heat sealable plastic sheeting which is not adversely affected in any way by subsequent cooking temperatures below about 275° F. A highly suitable material is the odor-free plastic sheeting made and sold by Minnesota Mining & Manufacturing Co., St. Paul, Minn., under the trade name "Scotch Pack #5." However, other odor-free, impervious and heat resistant sheetings which are heat sealable may be used. The packages are then placed in an automatic vacuum sealer 10 of known commercial type, operated with a vacuum of between 28 and 29 inches of mercury (at or near sea level—this would be adjusted for higher altitudes). This step is known per se and several types of equipment are available on the market; hence, it will not be described in further detail. The packages are heat sealed while under the vacuum.

As the wrapped uncooked products are removed from the vacuum packaging equipment, they are promptly placed on trays 22 supported in a retort cart 20. A typical cart carries a large mass or number, such as 400 to 500 packages, weighing 150 to 200 pounds or more, to form a full retort load. The loaded cart 20 is rolled into a retort 30. The door 31 is then closed and compressed air is turned on to flow into the retort through line 32. A valve 33 regulates the air flow. A circulating fan 34 moves the air and also live steam which is admitted through line 35 to maintain an even temperature throughout the retort. This avoids cold spots between the trays 22 during cooking. It also insures even cooling later.

After pressure in retort 30 has been built up to about 40 to 50 pounds per square inch, one or more pressure regulating valves 37, 38 are opened to maintain the cooking pressure at this level. Live steam is then turned on, being supplied from a boiler, not shown, through line 35, controlled by a valve 36. Proportions of steam and air are controlled to maintain a cooking temperature between about 230 and 250° F., preferably 240 to 245°. It takes usually about 15 to 18 minutes to bring the retort up to cooking temperature. After a temperature of 242° F. is reached, for salmon, as an example, the food is cooked for an appropriate time, about 70 minutes in the case of salmon in half-pound packages. Other meats, or larger packages, may require longer or shorter cooking times. The steam flow may be regulated manually, the operator watching the temperature and pressure, or it may be controlled by automatic temperature and pressure with responsive controls as will be obvious. Also, if desired, the air valve 33 may be controlled automatically.

After cooking is complete, the packaged food must be cooled to ambient temperature conditions without permitting vapor pressure inside the wrapper to loosen the wrapper. Such loosening is prevented by maintaining gas pressure in the retort during cooling. At all times during the cooling process, the pressure is kept slightly higher than the vapor pressure of water at the temperature of the moment. Thus, starting from a cooking temperature of 242° F., for example, where vapor pressure of water is about 11 pounds/sq. in. gauge (above atmospheric), the pressure inside the retort is kept well above 11 pounds per square inch, by admitting compressed air through line 32 under manual or automatic control of valve 33. As cooling proceeds, the steam in the retort will condense and drain into a receiver 40 from which it may be removed periodically or continuously under control of a valve 41. Water and accompanying vapors may be passed through a condenser and cooler as described below.

To cool the cooked packaged material to ambient temperatures, various procedures may be used. A preferred procedure is to admit a spray of cooling water through spray nozzles 45 at the top of the retort. If ordinary city water is used it usually contains enough mineral that it leaves the packages streaked with light mineral deposits, as the cooling water evaporates. This makes the packages unsightly. For this reason it is preferred, unless the regular city supply is unusually free of minerals, to cool the condensate from the cooking steam and use it as a cooling medium.

In this case, the hot water is withdrawn by a pump 50 and forced through the cooling coils 51 of an air cooled condenser 52. From the latter, the water preferably is passed through a water cooled heat exchanger 54 which brings its temperature down to nearly that of the normal water supply, e.g. 50 to 60° F. or so.

The cooled water is recycled by the pump 50, or by a supplemental pump if desired, to the spray nozzles 45 mentioned above. The latter may be of various types. A very satisfactory arrangement is to provide a pipe along the inside top of the retort with small openings spaced every few inches. A retort capable of cooking 200 pounds of packaged salmon in a single batch provides about 20 to 30 gallons of water (from condensed steam). This, being mineral free and clean, provides a good cooling medium. It can of course be recooled and recycled as long as necessary to cool the products down to the desired temperature level. During the whole cooling process, pressure on the outside of the package substantially exceeds that inside.

When the products are fully cooled to ambient atmospheric temperature, any pressure remaining inside the retort 30 is released (by valves 37, 38) and the door 31 can be opened. The food is still under a vacuum so that the wrapper clings to and tightly embraces the food, preventing any drainage of its liquids or accumulation of water, juices, etc. These remain right in the meat to maintain and enhance its flavor.

Instead of using a spray of water, a cooling liquid may be circulated through cooling coils 60 inside the retort 30. Such coils, of substantial total length (e.g. 220 feet of ¾ inch pipe in a retort of the size described above), will cool the chamber and the packaged products quite rapidly. Cold water may be used as the circulating medium. Cooling can be accomplished more rapidly if the water is chilled by refrigeration of any convenient type. Here again, the pressure inside the retort is controlled so as to keep the wrapper tightly engaging the packaged contents at all times.

Figure 3:
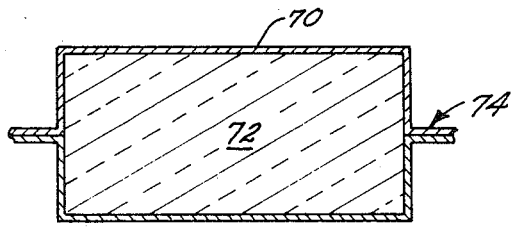
FIG. 3 is a sectional view of a typical package of food as produced by the process and apparatus of the invention.

A package of typical form is shown in FIG. 3. It consists of a plastic impermeable wrapper 70 drawn tightly around and confining closely the packaged product 72. The package may be of the simple tubular type, heat sealed by pressing between a pair of heat sealing jaw members of conventional type, or it may be wrapped and folded. The simple flat end seat is shown at 74, but it will be understood that this is merely representative of various types of seals that may be made.

Other variations and modifications will suggest themselves to those skilled in the art. It is intended by the claims which follow to cover all such, as far and as broadly as the state of the prior art properly permits.

What is claimed is:

1. Apparatus for packaging and preserving food to retain delicate flavor, which comprises a pressurized retort, means for supporting a mass of wrapped packages of said food in said retort means for supplying air under pressure to said retort, means for supplying live steam to said retort, means for circulating said steam and said air to maintain a substantially even cooking temperature to said mass of packages, means for supplying a cooling medium to said retort, means for regulating the pressure in said retort to keep the wrappers tight about the packages during cooking, means attached to the retort for withdrawing steam, air-cooled means for cooling the condensate, water-cooled means for further cooling the condensate, and means for recycling the condensate as a cooling medium.

2. The process of packaging and preserving delicately flavored foods by retaining their juices in situ and preventing access of air, which comprises packaging the food in evacuated plastic wrappers which are not affected by heat at coooking temperature, placing the evacuated packages in a pressurized cooking chamber, forcing steam and compressed air into said chamber to maintain a pressure during cooking which is higher than water vapor pressure at the cooking temperature, thereby to insure that the wrappers will closely confine the food therein and to cook at a temperature of about 230 to 260° F., circulating said steam and said air during cooking to maintain a substantially uniform temperature throughout the cooking chamber, thereafter cooling the cooked product to ambient temperature while maintaining at all times a pressure on the packages in excess of the vapor pressure of water at the instant temperature, and cooling the food uniformly by circulating extensively a cooling medium all around all of said packages.

3. Process according to claim 2 which comprises removing the spent steam as it condenses, cooling said condensate and recycling it as a spray to cool the cooked product after cooking is completed.

4. Process according to claim 2 which comprises cooling by circulating the cooling medium through extensive cooling coils surrounding the packaged, cooked food.

(References on following page)

References Cited

UNITED STATES PATENTS

| | | | |
|---|---|---|---|
| 1,627,770 | 5/1927 | Durkee | 99—182X |
| 1,709,481 | 4/1929 | Mullen | 99—182X |
| 2,948,619 | 8/1960 | Ashley | 99—251X |
| 3,131,979 | 4/1964 | Martins | 99—214X |
| 3,132,029 | 5/1964 | Beck | 99—182X |
| 3,215,538 | 11/1965 | Sada | 99—214 |
| 3,365,311 | 1/1968 | Schmidt | 99—214 |
| 775,144 | 11/1904 | Mathie | 99—370 |
| 2,328,751 | 9/1943 | Snyder | 99—320X |
| 3,511,169 | 5/1970 | Fritzberg | 99—214X |

FOREIGN PATENTS

| | | | |
|---|---|---|---|
| 957,680 | 5/1964 | Great Britain | 99—214 |
| 361,187 | 5/1962 | Switzerland | 99—214 |

FRANK W. LUTTER, Primary Examiner

R. HALPER, Assistant Examiner

U.S. Cl. X.R.

99—174, 370